March 13, 1928.

O. E. HUNT ET AL

AUTOMOBILE CHASSIS

Filed Aug. 8, 1924

1,662,515

Patented Mar. 13, 1928.

1,662,515

UNITED STATES PATENT OFFICE.

ORMOND E. HUNT AND ALBERT G. GEISTERT, OF DETROIT, MICHIGAN, ASSIGNORS TO GENERAL MOTORS CORPORATION, OF DETROIT, MICHIGAN, A CORPORATION OF DELAWARE.

AUTOMOBILE CHASSIS.

Application filed August 8, 1924. Serial No. 730,859.

This invention relates to automobile chassis, and is illustrated as embodied in the chassis of a model M air-cooled Chevrolet. An object of the invention is to provide a very strong but relatively inexpensive spring suspension with its parts so arranged as to minimize weaving of the frame and springs, and so arranged as not to react on the steering mechanism. In one desirable arrangement, quarter-elliptic springs secured to the axle are clamped to brackets depending from the side frame members by means also holding rigid torque or bracing members extending under the side frame members and secured to a cross member connecting the side members.

The above and other objects and features of the invention, including various novel combinations and desirable particular constructions, will be apparent from the following description of one illustrative embodiment shown in the accompanying drawings, in which:

Figure 1 is a top plan view of part of the front end of the chassis;

Figure 2 is a side elevation of the part of the chassis shown in Figure 1;

Figure 3 is a side elevation on a larger scale, and partly broken away, of part of the arrangement shown in Figure 2; and Figure 4 is a section on the line 4—4 of Figure 2, showing the means for securing various parts together.

In the arrangement selected for illustration, the chassis comprises a front axle 10, a frame including side frame members 12, an air guide 14, and an air-cooled engine 16. The engine has at its rear end oppositely-extending lugs 18 resting on sheet metal brackets 20 riveted to the side frame members 12, and secured to the brackets by bolts 22. This arrangement, with a front support not shown in detail, provides a three-point suspension for the engine, while at the same time the engine and its lugs 18 constitute a cross member connecting the side frame members 12.

Depending from each side member 12, between the front axle and the corresponding bracket 20, is a spring bracket 30 for the rear end of a quarter-elliptic spring 32 connected at its front end to the front axle. To allow steering with a minimum of interference from the spring action, the steering column 34 operates a shaft 36 having a bearing at the top of the spring bracket, a steering arm 38 extending beside the bracket being arranged to control the wheels by means of the usual drag link 40.

To strengthen the construction, as explained above, the rear end of each spring 32 is embraced by the front end of a channel member 42, the spring and channel member being clamped in the spring bracket by means of U-bolts 44. At its rear end, each channel member is secured by a bolt 46 passing through a spacer 48, and having its head engaging the corresponding bracket 20 in an opening 50 in lug 18.

While one illustrative embodiment has been described in detail, it is not the intention to limit the scope of the invention to that particular embodiment, or otherwise than by the terms of the appended claims.

We claim:

1. A chassis comprising, in combination, an axle, a frame having spaced side members above the axle, a cross member connecting the side members, a bracket depending from each side member between the axle and the cross member, a pair of quarter-elliptic springs extending from the brackets to the axle, a pair of channel members, each embracing the end of one of the springs and connected to the cross member inside of the corresponding side member, and means for clamping each bracket and its spring and channel member together.

2. A chassis comprising, in combination, an axle, a frame having spaced side members above the axle, a cross member connecting the side members, a bracket depending from each side member between the axle and the cross member, a pair of quarter-elliptic springs extending from the brackets to the axle, a pair of rigid members, each engaging the end of one of the springs and connected to the cross member inside of the corresponding side member, and means for securing together each bracket and its spring and rigid member.

3. A chassis comprising, in combination, an axle, a frame having spaced side members above the axle, a cross member connecting the side members, a bracket depending from each side member between the axle and the cross member, a pair of quarter-elliptic springs extending from the brackets to the axle, a pair of rigid members, each engaging the end of one of the springs and connected to the cross member inside of the corresponding side member, means for securing together each bracket and its spring and rigid member, and steering mechanism including a steering arm and a drag link swiveled together immediately adjacent the rear end of one of the springs.

4. A chassis comprising, in combination, an axle, a frame having spaced side members above the axle, a cross member connecting the side members, a bracket depending from each side member between the axle and the cross member, a pair of quarter-elliptic springs extending from the brackets to the axle, a pair of rigid members, each engaging the end of one of the springs and connected to the cross member inside of the corresponding side member, means for securing together each bracket and its spring and rigid member, and steering mechanism including a steering shaft journaled in one side member and its bracket, a vertical steering arm on the outer end of the shaft, and a drag link swiveled to the bottom of the steering arm immediately adjacent the rear end of the spring.

5. A chassis comprising, in combination, a front axle, a chassis frame having side members above the axle, an engine supported on the frame at its front end and having oppositely-extending lugs at its rear end, supporting brackets secured to the side frame members and supporting said lugs, spring brackets on the side members between the supporting brackets and axle, quarter-elliptic springs secured to the front axle and to said spring brackets, rigid members secured to the ends of the springs at the spring brackets and extending adjacent said supporting brackets, and bolts securing the rigid members and the engine lugs and the supporting brackets together.

In testimony whereof we affix our signatures.

ORMOND E. HUNT.
ALBERT G. GEISTERT.